United States Patent

[11] 3,563,555

| [72] | Inventor | Harold O. Koons<br>New Berlin, Wis. |
|---|---|---|
| [21] | Appl. No. | 717,297 |
| [22] | Filed | Mar. 29, 1968 |
| [45] | Patented | Feb. 16, 1971 |
| [73] | Assignee | Waukesha Bearings Corporation<br>Waukesha, Wis.<br>a corporation of Wisconsin |

[54] METHOD OF REPLACING SEALING RINGS AROUND SHAFTS
9 Claims, 12 Drawing Figs.

[52] U.S. Cl. .................................................. 277/1, 277/9, 277/220
[51] Int. Cl. .................................................. F16j 9/00, E21b 33/00
[50] Field of Search .......................................... 29/401, 453; 277/1, 9, 220

[56] References Cited
UNITED STATES PATENTS

| 1,942,489 | 1/1934 | Pfefferle .................. | 277/220 |
| 3,413,008 | 11/1968 | Greiner .................... | 277/153X |

*Primary Examiner*—Samuel B. Rothberg
*Attorney*—Morsell & Morsell

ABSTRACT: In a method of replacing flexible sealing rings around shafts in massive installations, the steps of disconnecting and axially shifting parts to provide working space, radially cutting each new sealing ring to provide separable adjacent ends which may be flexed and spread to install the sealing rings around the shaft by transverse movement into installed position, adhesively bonding the cut ends together while around the shaft, cutting off the worn sealing rings, and reassembling the parts.

PATENTED FEB 16 1971
3,563,555
SHEET 1 OF 4
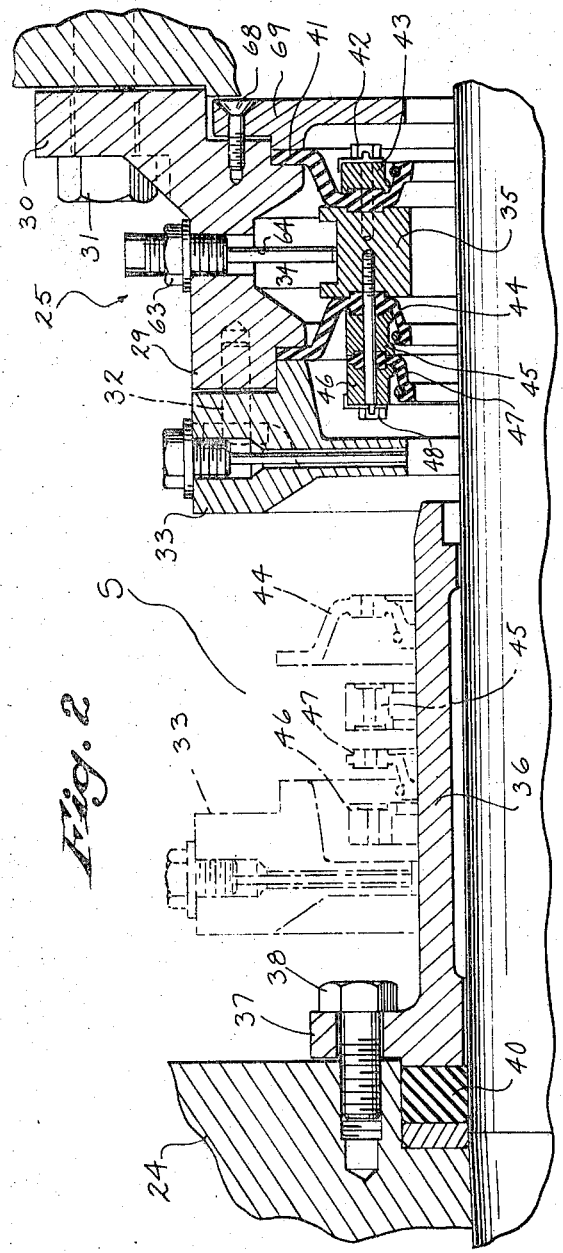
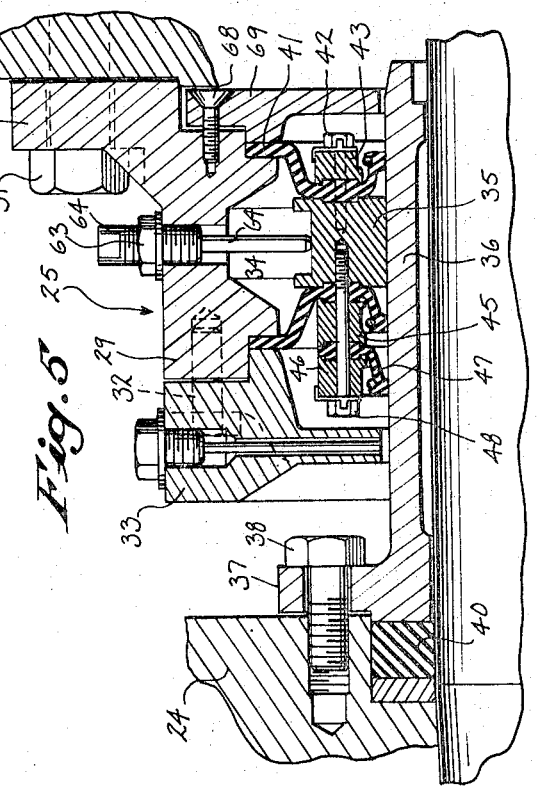
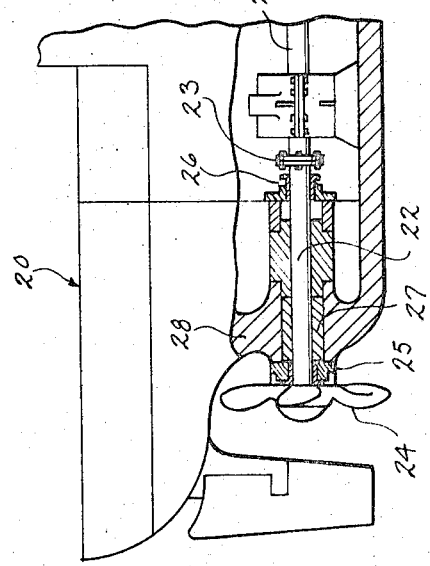
INVENTOR
HAROLD O. KOONS
BY
Morsell & Morsell
ATTORNEYS

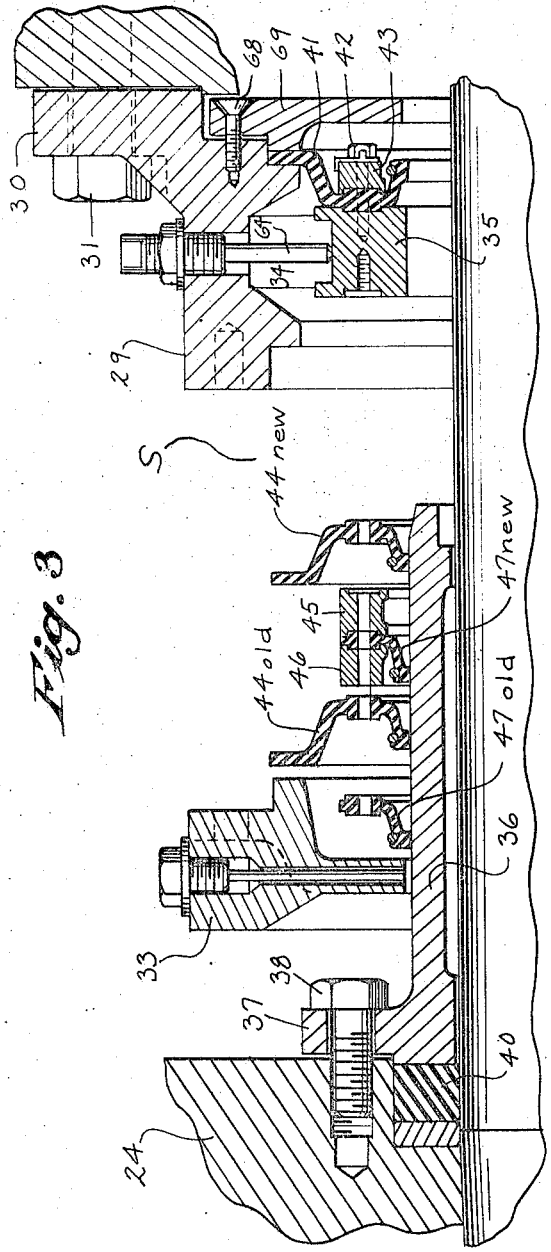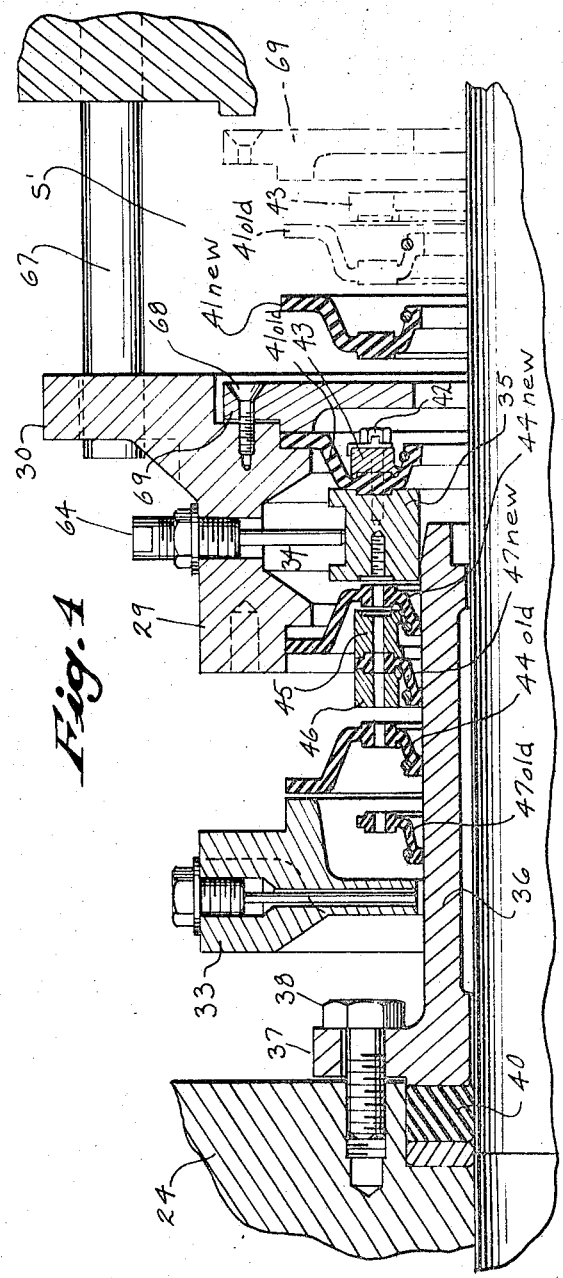

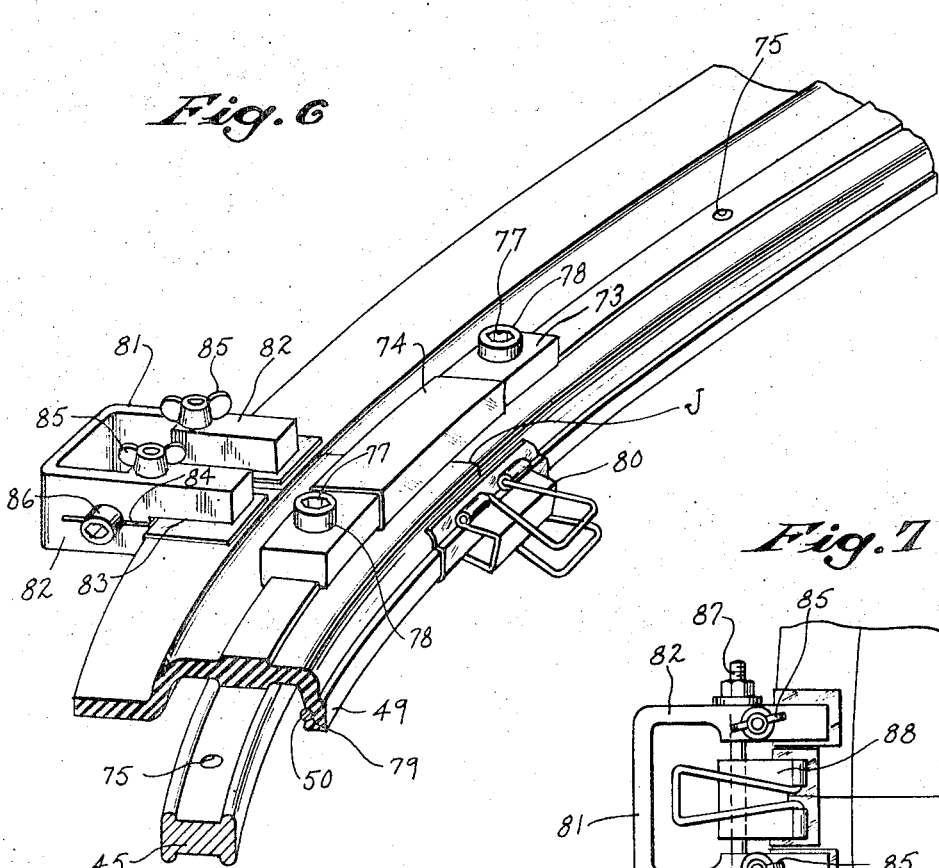
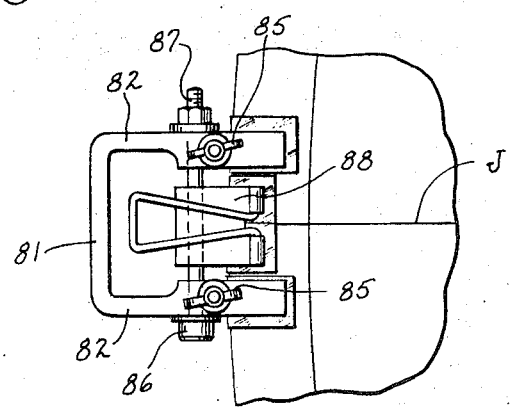
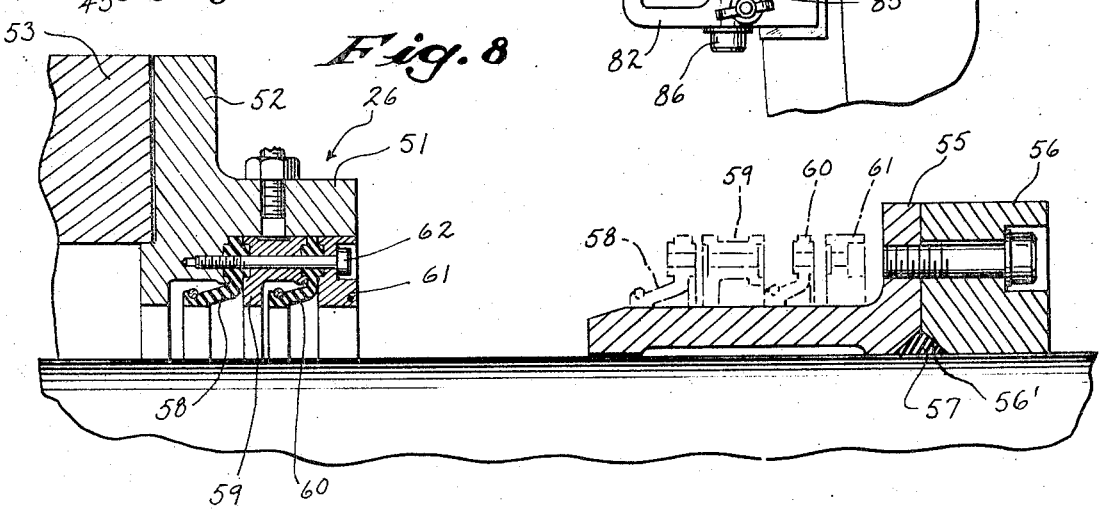
INVENTOR
HAROLD O. KOONS
BY
Morsell & Morsell
ATTORNEYS

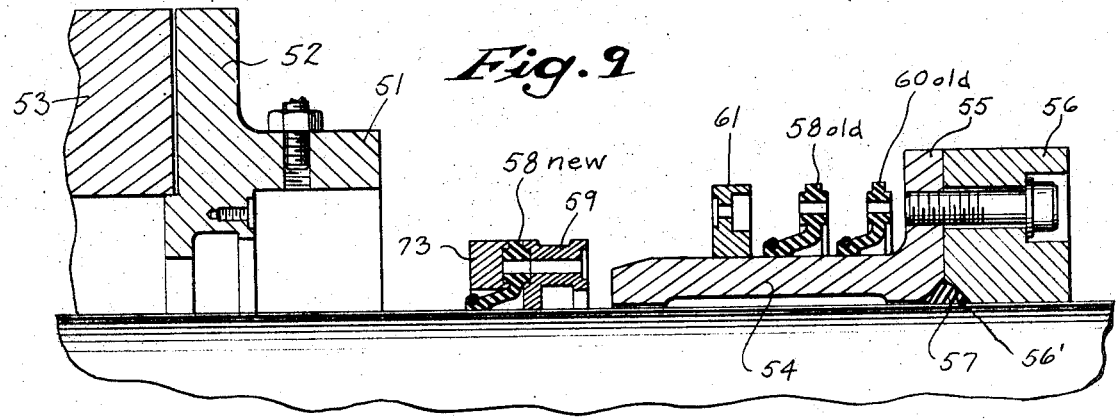
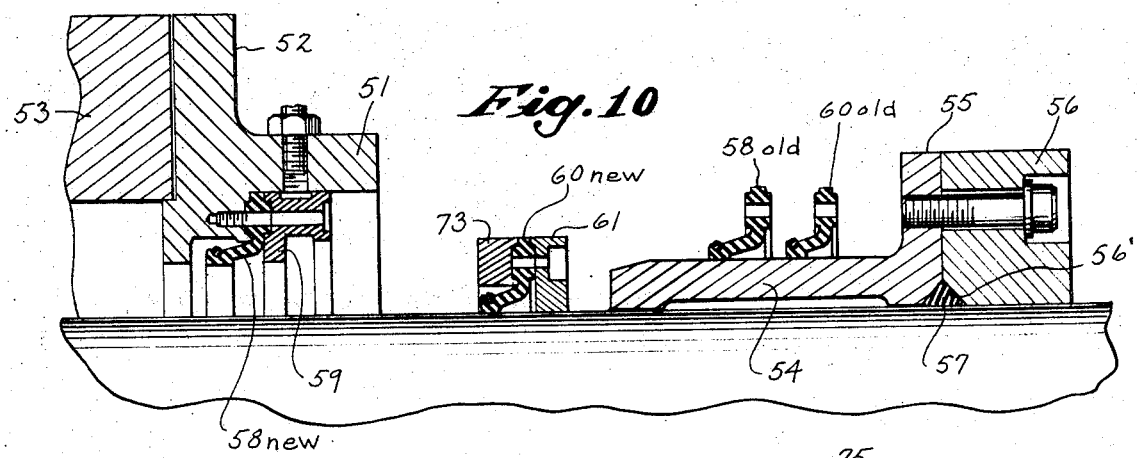
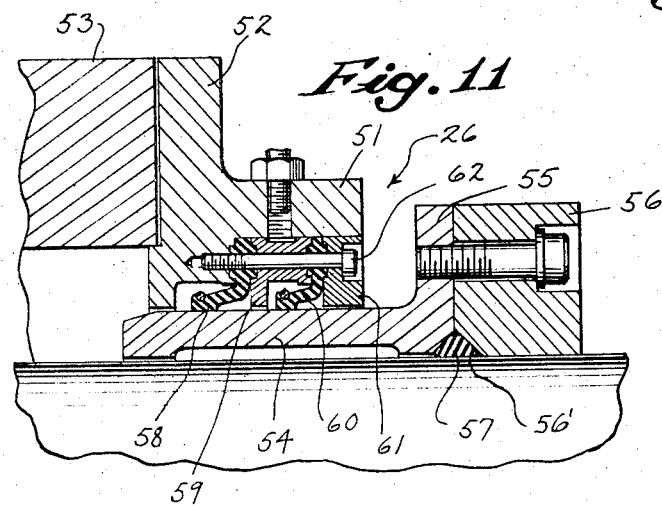
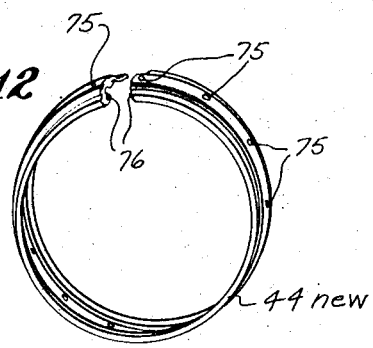
INVENTOR
HAROLD O. KOONS
BY
Morsell & Morsell
ATTORNEYS

3,563,555

METHOD OF REPLACING SEALING RINGS AROUND SHAFTS

BACKGROUND OF THE INVENTION

1. Field of the Invention

While the present invention is suitable for use in the replacement of seals in any massive installation, it is particularly suitable for use in replacing seals around the propeller shaft of a ship.

2. Description of the Prior Art

In ships, rubber sealing rings are commonly used in both the forward and aft sealing assemblies which surround the tailshaft of a ship, such sealing assemblies being for the purpose of excluding sea water, and also for holding lubricating oil in the stern tube bearing. After a period of use these sealing rings become worn and hard, necessitating replacement. Prior to the present invention sealing rings could only be replaced while the ship was in dry dock, and such replacement involved substantial cost and lost time. Dry docking was always essential because it was heretofore always necessary to remove the propeller. This required a complicated unshrinking procedure. Furthermore, such propellers weigh up to 50 tons, and sometimes more, and special handling equipment is required. Heretofore there was no known method of replacing propeller shaft seals without going into dry dock and removing the propeller.

SUMMARY OF THE INVENTION

The present invention provides a novel method of procedure whereby sealing rings can be replaced while the ship is afloat and at dockside and without removing the propeller. With this novel procedure, aft seal rings can be replaced in from 12 to 48 hours and the forward seal assembly rings can be replaced in 12 hours or less.

A more specific object of the invention is to provide a novel method of replacing sealing rings in massive installations which involves the disconnection and axial shifting of a sufficient number of parts to provide access to the worn sealing rings; the radial cutting of new sealing rings to provide separable ends whereby the new sealing rings may be transversely installed around the shaft by separating said ends and flexing the rings; the adhesive bonding of the cut ends of the new rings after installation; the cutting off of the old rings; and the reassembly of the sealing assembly parts.

While the present invention is particularly useful in solving the usual cost and time delay problems when replacing seals on ships, the procedure is obviously suitable for use in other massive installations where similar replacement problems are present.

With the above and other objects in view, the invention consists of the improved method of replacing sealing rings around shafts in massive installations, and all of its steps and combinations of steps, as set forth in the claims, and all equivalents thereof.

BRIEF DESCRIPTION OF THE DRAWINGS

In the accompanying drawings, illustrating the procedures used in replacing seals on a ship, and illustrating preferred apparatus for carrying out the improved method, in which the same reference numerals designate the same or similar parts in all of the views:

FIG. 1 is a fragmentary partially diagrammatic longitudinal sectional view through the stern of a ship showing the tailshaft and its bearings and the relative positions of the aft and forward seals;

FIG. 2 is a fragmentary longitudinal sectional view through the aft seal assembly after parts have been disconnected and after the tailshaft has been shifted in an aft direction, the dot and dash lines showing positions of seal assembly parts after they have been disconnected and shifted in an aft direction along the liner;

FIG. 3 is a similar view showing new sealing rings being installed;

FIG. 4 is a similar view showing the casing and forward cover shifted in an aft direction from the position of FIG. 3 to provide access to the forwardmost of the three sealing rings in an aft seal assembly, the dot and dash lines showing disconnected and shifted positions of the forward cover and adjacent seal and also showing a new sealing ring encircling the tailshaft;

FIG. 5 is a similar view showing the reassembled aft seal assembly;

FIG. 6 is a fragmentary perspective view showing the procedure and apparatus for bonding a sealing ring while it is in position surrounding the tailshaft;

FIG. 7 is a fragmentary top view of some of the parts of FIG. 6 showing a pressure clamp at the joint;

FIG. 8 is a fragmentary longitudinal sectional view showing the liner for the forward seal assembly shifted in a forward direction to provide working space, the dot and dash lines illustrating the sealing rings and supporting rings in disconnected and forwardly shifted position;

FIG. 9 is a view similar to FIG. 8 showing the new sealing ring as its ends are being bonded together;

FIG. 10 is a similar view showing the bonding of the ends of the other forward sealing ring;

FIG. 11 is a fragmentary longitudinal sectional view showing the reassembled forward seal; and FIG. 12 is a perspective view of a sealing ring after it has been radially cut to provide adjacent cut ends.

DESCRIPTION OF THE PREFERRED EMBODIMENTS

While the invention is suitable for use in the replacement of flexible sealing rings used in various installation, it has been preferred to illustrate the procedure as it is applied to the aft and forward seals around the tailshaft of a ship, as this is where the invention finds its greatest utility.

Referring to FIG. 1, the numeral 20 designates a ship having a propeller shaft 21 with a tailshaft portion 22 which is connected to the main propeller shaft portion by a disconnectable coupling 23. The outer end of the tailshaft carries the usual propeller 24 which is generally installed with a shrink fit. Such propellers may weigh up to 50 tons or more on large ships. Forwardly of the propeller is the aft seal assembly which is designated generally by the numeral 25. Just to the stern of the coupling 23 is the forward seal assembly 26. The tailshaft 22 is journaled in a bearing 27 which is supported within a hull portion 28.

THE AFT SEAL ASSEMBLY

Referring now to FIG. 5, there is a seal casing 29 with an annular flange 30 which is secured by studs 31 to the hull. Detachably secured by bolts 32 to the aft end of the casing 29 is the aft cover 33. Within the casing 29 is a seal chamber 34 and within the latter is a guide ring 35 surrounding a tubular liner 36. The liner has an annular flange 37 which is removably secured by bolts 38 to the propeller 24, there being an O-ring 40 at the aft end of the line and surrounding the tailshaft.

Removably secured to the forward side of the guide ring 35 is a sealing ring 41. This is held in place by bolts 42 extending through a brass supporting ring 43, through holes in the sealing ring 41, and into the guide ring. On the aft side of the guide ring 35 is a sealing ring 44 held between a brass supporting ring 45 and the guide ring 35. Between the brass supporting ring 45 and another brass supporting ring 46 is another sealing ring 47. Bolts 48, which extend through holes in the supporting rings 45 and 46 and through the holes in the sealing rings, removably secure the parts to the guide ring 35 as illustrated. Each of the sealing rings has a lip 49 which is urged into sealing engagement with the liner 36 by a garter spring 50 (see FIG. 6).

THE FORWARD SEAL ASSEMBLY

The forward sealing assembly (FIG. 11) includes an annular casing 51 having an annular flange 52 which is removably secured by bolts to a portion 53 of the bearing housing. A forward liner 54 surrounds the tailshaft and said liner has an annular flange 55 which is removably secured to one end of a two part clamping ring 56, the latter being formed of two half rings which are bolted together in clamping relationship around the tailshaft. A rubber O-ring 57 surrounds the shaft and is located in a groove 56' between the clamping ring 56 and the end of the liner.

Within the casing 51 is a sealing ring 58 which is removably positioned between a portion of the casing and one side of a guide ring 59. Another sealing ring 60 is located between the other side of the guide ring and a forward supporting ring 61. Bolts 62 extending through holes 75 circumferentially spaced in the rings 59 and 61 and through holes in the sealing rings removably secure the parts in the assembled relationship of FIG. 12.

The sealing rings are formed of suitable rubber or synthetic rubber or other flexible material capable of excluding sea water and of retaining lubricating oil in the stern tube bearing, preferably "Buna-N" rubber material.

Any sealing ring material ultimately becomes worn after a period of usage, and the rubberlike material hardens and requires replacement. Heretofore it has been considered necessary to put a ship in dry dock in order to replace the sealing rings 58, 60, 44, 47 and 49. Also it was necessary to remove the propeller 24 of FIG. 1 in order to get at the parts of sealing assembly 25 to remove enough of said parts to enable the old rings to be removed and new rings to be slipped onto the end of the tailshaft. It was similarly difficult to replace the seal rings in the forward seal assembly. To remove a propeller from a large ship requires the expenditure of a substantial amount of time because propellers are usually shrunk fit into position, and an unshrinking procedure is required to remove a propeller. This is usually accomplished by use of a steam blanket. In addition, the handling of the extremely large and heavy propeller, which may weigh 50 tons or more, requires elaborate procedure and special equipment. The time and expense while a ship has been at dry dock for this type of procedure has been a source of agitation, and the loss of use of the ship has been expensive to the owner.

With the improved method of replacement of the present invention aft sealing rings can be replaced while the ship is afloat and at dockside in from 12 to 48 hours, and the rings in the forward seal assembly can normally be replaced in approximately 12 hours.

REPLACEMENT PROCEDURE

In order to replace the rings of the aft seal, after preliminary checking and preliminary preparation procedures including the draining of oil from the stern tube, the coupling 23 is disconnected so that the tailshaft 22 can be axially shifted. Next, and referring to FIG. 11, the bolts holding the two part clamping ring 56 are loosened so as to free the tailshaft. Next, and referring to FIG. 5, several of the oil filler plugs 63 are removed and replaced with at least three set screws 64. These setscrews have inner ends which engage the outer periphery of the guide ring 35 to maintain the guide ring in a concentric position with respect to the tailshaft. Next the tailshaft is axially shifted in an aft direction as shown in FIG. 2 to withdraw the liner 36 from the seal casing 29. Thereafter the aft seal cover 33 is unbolted by removing the bolts 29, and such cover is then shifted axially to the dot and dash line position shown in FIG. 2. The sealing rings may then be visually inspected. Due to the axial shifting of the tailshaft a working space S in FIG. 2 is provided.

Assuming that the sealing rings need replacement, the bolts 48 are removed to free the brass rings 45 and 46 and sealing rings 47 and 44. The brass rings are then axially shifted in an aft direction over the liner as shown in dot and dash lines in FIG. 2 and the two old rings are moved to an aft position with respect to both brass rings 45 and 46 as shown in FIG. 3. While the old rings could be cut away at once, it is preferred, as a precaution, to leave them in position until the new sealing rings have been successfully installed.

Next new replacement rings for the sealing rings 44 and 47 are cut radially through as shown in FIG. 12 for the ring 44, so as to provide separable adjacent ends on the new ring. These ends are spread and the new ring 47 is flexed to enable it to be slipped transversely into place over the liner as indicated in FIG. 3 by the numeral 47 (new), the ring being temporarily located on the liner between the two brass supporting rings 45 and 46. With these two rings temporarily spread apart to be out of the way, the cut ends 76 of the new ring 47 are adhesively bonded together by a procedure to be hereinafter described in detail.

Next another new ring to replace the next adjacent sealing ring is radially cut to provide two separable ends as shown in FIG. 12, and this ring 44 (new) has its ends spread and flexed so that it can be slipped transversely into place over the liner 36 as shown in FIG. 3. Thereafter the cut ends of the ring 44 (new) are adhesively bonded together as will be hereinafter described in detail.

To obtain access to the next ring the screws 31 are removed and long slide studs 67 are installed as shown in FIG. 4, the casing 29 being slid in an aft direction on the studs as shown in FIG. 4 to provide a working space S' as illustrated, the slide studs maintaining the casing in concentric relationship with the shaft. Thereafter the screws 68 which hold the forward cover 69 in position are removed and the cover 69 is slid in a forward direction as shown in FIG. 4. Next the studs 42 are removed to permit axial sliding movement of the brass supporting ring 43 and sealing ring 41 in an aft direction to the dotted line position shown in FIG. 4. Next a new sealing ring 41 (new) to replace the ring 41 is radially cut in the same manner as heretofore described in connection with the rings 44 and 47. Its ends are spread and the ring is flexed to permit transverse installation to the position shown in FIG. 4. Then with the working space S' available the cut ends of the ring 41 (new) are bonded together.

After the above has been completed the three old rings are cut off and removed. Thereafter all of the parts are axially shifted and reassembled in the positions shown in FIG. 5 and the tailshaft is slid in a forward direction and recoupled.

In order to replace the forward seal shown at the right hand end of FIG. 3 and designated by the numeral 26 in FIG. 1, after preliminary procedures, including the draining of oil in the stern tube and seal, it is necessary to first loosen the liner clamping members 56 so that the latter and forward liner 54 may be slid in a forward direction as shown in FIG. 8. Thereafter the bolts 62 are removed to permit sliding of the rings 61 and 59 and the sealing rings 60 and 58 in a forward direction to the dot and dash line position of FIG. 8. Then the old seals are moved to a forward position with respect to the metal rings. Next a new sealing ring 58 (new) to replace the sealing ring 58 is radially cut to provide separable ends. The ring is then spread and flexed to enable transverse installation on the shaft to the position shown in FIG. 9. In this position, its ends are bonded together by the procedure to be hereinafter described.

Next, as shown in FIG. 10, new seal 60 (new) to replace the seal 60 is radially cut as in FIG. 12, its ends are spread and it is flexed over the shaft to the position shown in FIG. 10. In this position its ends are bonded together. The old rings are then cut and removed and the new rings are reassembled to the position shown in FIG. 8 by reinserting the bolts 62 through the rings 59 and 61 and through the two sealing rings. Next the liner and loose clamping rings 56 are slid in an aft direction to the assembled position of FIG. 11 and the bolts of the complementary half clamping rings 56 are tightened.

ADHESIVE BONDING PROCEDURE

The adhesive bonding of any of the sealing rings of the aft seal or forward seal is essentially the same except that the clamps may be used somewhat differently, depending upon the cross-sectional shape of the particular ring. FIGS. 6 and 7 disclose the bonding procedure for one of the larger aft sealing rings such as the sealing ring 44, which procedure is carried out while the ring is in position around the tailshaft.

As a first step in the procedure the adjacent supporting ring, which in this case is the brass ring 45 of FIG. 5, is wrapped with a protecting sheet of antiseizing material to protect it from the adhesive. This may be a suitable plastic film such as that sold under the trademark "Mylar." Also, the special metal clamping segment 73 is similarly wrapped with the plastic film 74 as illustrated in FIG. 6.

The sealing ring has heretofore been radially cut intermediate two of the bolt holes 75 of the ring as shown in FIG. 12. Care must be taken not to contaminate the cut ends 76 of the ring. The adhesive may be a suitable adhesive that will stand up under the conditions encountered, including temperatures in the vicinity of 200° F. Preferably an epoxy type adhesive is employed together with a hardening agent, the adhesive preferably being of a type which polymerizes under heat and pressure. After careful cleaning and preparation of the end faces, and after the adhesive and hardening agent have been thoroughly and carefully mixed, a small quantity is applied to each of the cut ends 76 by scrubbing the adhesive mixture into the end faces, the sealing ring being partially bolted to the brass ring 45. Excess adhesive is removed by scraping with a spatula. The adhesively coated ends are adjacent the "Mylar" covered ring 45 of FIG. 6, with the joint J over the "Mylar." Then a special clamping segment 73, protected by plastic film 74, is placed over the joint J. Then the sealing ring 44 (new) is secured between the clamping segment 73 and the brass ring 45 by means of bolts 77 which pass through holes 75 in the sealing ring 44 on each side of the joint, it being noted that the cut ends 76 forming the joint J are located between the two bolt holes. Then after drawing the cut ends closely together at the joint J the nuts 78 are tightened to clamp the ends in juxtaposed condition. The clamping further compresses the rubber of the sealing ring 66 and further tightens the joint. A pressure clamp 81 may also be employed on the wider sealing rings, as shown in FIG. 6, said clamp having spaced legs 82 with slots 83 for receiving the thickness of the sealing ring, as shown in FIG. 7. The slots 83 create bifurcated ends which are flexible due to the extension slits 84. By turning down the clamping nuts 85 the arms 82 may be clamped to the rubber, one on each side of the joint J. After this is accomplished the draw screw 86 on a transverse bolt 87 is taken up to urge the cut ends tightly together at the joint J. The joint is then inspected to make sure that there is no excess adhesive beyond the "Mylar" coverings. If there is any, it is wiped off to prevent bonding the rubber to the clamping segment 73 or brass ring 45.

Next the garter spring 50 is placed within the groove 79 of the sealing ring, the portion of the garter spring near the joint being covered with "Mylar." It is desirable to have the garter spring draw the groove 79 to a small diameter to compress the lip area into intimate contact. If the spring is too loose it may be stretched over available bolts to temporarily accomplish this purpose. Next a "Mylar" protected spring clamp 80 is applied to the garter spring and sealing ring lip in the manner shown in FIG. 6. The spring serves as a key in the groove. When the clamp 81 is used a similar spring clamp 88 is employed intermediate the legs 82 of said pressure clamp 81 in the manner shown in FIG. 7. "Mylar" is used to protect the metal of the spring clamps 80 and 88 as well as the metal of the pressure clamp from getting in contact with adhesive.

After all the clamps are in place, heat is applied to the clamp 73, ring 45, and joint J. This heat is preferably heat from a hot air blower. The joint is subjected to heat of between 180—200° F. for a minimum period of 90 minutes. The temperature may be checked by suitably applying a thermometer to the clamping segment 73. This may be facilitated by furnishing the segment with a thermometer-receiving groove or bore. Thereafter the joint is allowed to cool, and when it has cooled down to approximately 100° F. the spring clamps, clamping segment and pressure clamp may be removed, as well as the bolts 77 and the "Mylar." After the joint has cooled to ambient temperature it is carefully checked and, if satisfactory, any excess adhesive flash is cleaned off with sandpaper, and the joint is inspected by minor flexing and visual means. The joint is then carefully oiled. Thereafter the bonded sealing ring may be installed in one of the assembled positions shown in FIGS. 7 and 11 as heretofore described.

From the above it is believed clear that with the novel procedure of the present invention new rings may be installed transversely around a shaft in a relatively short period of time, and this may be accomplished without putting the ship in dry dock. Thus the ship does not have to be out of service for more than 48 hours for an aft ring replacement of for more than 12 hours for a forward ring replacement.

While the novel procedure is particularly suitable for use on ships where the replacement problem is acute, this procedure is obviously suitable for use in connection with other massive installations where an endwise installation of a sealing ring cannot readily be accomplished.

Various changes and modifications may be made without departing from the spirit of the invention, and all of such changes are contemplated as may come within the scope of the claims.

I claim:

1. In a method or replacing a flexible sealing ring around a shaft, the steps of cutting a new sealing ring to provide separable ends, spreading said ends and flexing the ring while moving it in a transverse direction into installed position around the shaft, adhesively bonding the cut ends together while the sealing ring is around the shaft, cutting off the worn sealing ring, and axially moving the new sealing ring into assembled position wherein the shaft has an axially shiftable portion and wherein there is a seal assembly having disconnectable ring-shaped parts for supporting the sealing ring, the method including the step of disconnecting and axially shifting sealing-ring-supporting parts into a portion of said working space and using an adjacent portion of said working space to accommodate the new sealing ring during bonding.

2. In a method of replacing a flexible sealing ring as claimed in claim 1, the step of clamping the radially cut portion of the new sealing ring against one of said sealing-ring-supporting parts during bonding.

3. In a method of replacing a flexible sealing ring as claimed in claim 1 wherein the ring-shaped parts for supporting the sealing ring have circumferentially spaced bolt holes and wherein the sealing ring has similarly spaced bolt holes, the method including the making of the radial cut in the new sealing ring between two bolt holes, and including the clamping of the new sealing ring against one of the ring-shaped-supporting parts by the use of bolts passing through some of said bolt holes in said holding part and through the bolt holes in the sealing ring which are on each side of the line of cut.

4. In a method of replacing a flexible sealing ring as claimed in claim 1 wherein one of said sealing-ring-supporting parts is a guide ring, the method including the supporting of the guide ring in concentric position with respect to the shaft before said sealing-ring-supporting parts are disconnected and shifted.

5. In a method of replacing a flexible sealing ring as claimed in claim 1 wherein there is a casing for the seal assembly, the method including the step of axially shifting said casing while maintaining the casing in concentric position with respect to said shaft.

6. In a method of replacing a flexible sealing ring around a shaft, the steps of cutting a new sealing ring to provide separable ends, spreading said ends and flexing the ring while moving it in a transverse direction into installed position around the shaft, adhesively bonding the cut ends together while the sealing ring is around the shaft, cutting off the worn sealing ring, and axially moving the new sealing ring into assembled position, the method including the application of the adhesive to the cut ends while the sealing ring is around the shaft, the clamping of the adhesively coated ends together, the curing of the adhesive by heat while the ends are clamped and while the ring is around the shaft, and the removing of the clamps after curing.

7. In a method of replacing a flexible sealing ring around a shaft as claimed in claim 6, the step of protecting the clamps from the adhesive during bonding.

8. In a method of replacing a flexible sealing ring as claimed in claim 1 wherein the shaft is a propeller shaft in a ship and has a separable tailshaft portion, the method including the step of uncoupling the tailshaft portion and axially shifting it in an aft direction to provide working space of a size to receive the new sealing ring and permit carrying out of the adhesive bonding procedure.

9. In a method of replacing a flexible sealing ring as claimed in claim 8 wherein the tailshaft portion carries the propeller of the ship and in which the axial shifting and installation of the new seal is performed while the propeller remains on said tailshaft portion.